Figure 1:
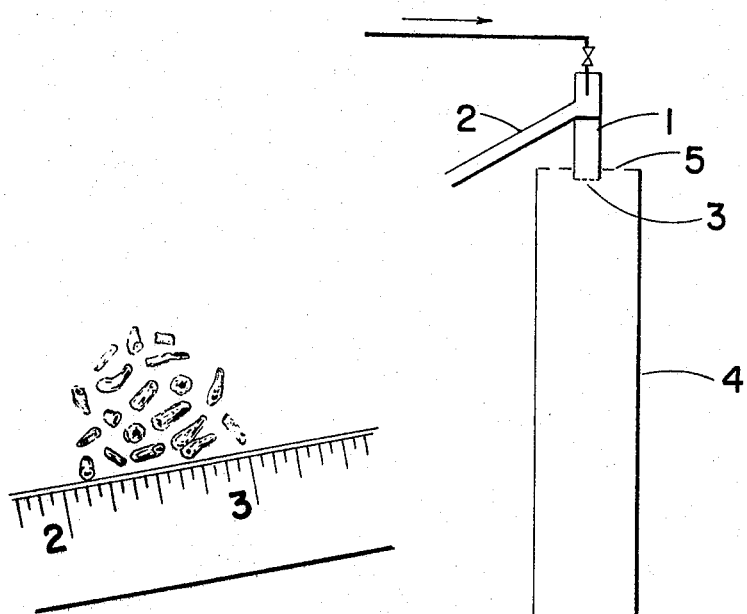

INVENTORS
Peter M. Wisneski
Charles F. Mosier Jr.
BY
Carl A. Cline
AGENT

United States Patent Office 3,334,160
Patented Aug. 1, 1967

3,334,160
PARTICULARIZATION METHOD
Peter M. Wisneski and Charles F. Mosier, Jr., Overland Park, Kans., assignors to Gulf Oil Corporation, Pittsburgh, Pa., a corporation of Pennsylvania
Filed Mar. 26, 1965, Ser. No. 443,144
3 Claims. (Cl. 264—14)

This invention relates to a method for conversion of a homogeneous melt into solid particles of substantially uniform size and shape. More particularly, this invention is a method of converting a melt of ammonium nitrate or similar substance into substantially uniform particles of controlled porosity which possess only one axis of symmetry.

The prilling of substances such as ammonium nitrate or urea which readily form homogeneous concentrated solutions or melts that freeze sharply into firm non-tacky solids is well known. The liquid melt or very concentrated hot aqueous solution is sprayed into the top of a tall tower and is allowed to fall through a column of relatively cool air. During the fall the melt solidifies and in a properly designed and operated tower, reaches the bottom in the form of fine solid spheres of fairly uniform size.

In the conventional prilling tower the hot liquid is extruded downward under low hydraulic pressure through small orifices of about 0.025 to 0.030 inch diameter. The liquid falls in a continuous, small diameter stream which gives up both heat and moisture slowly to the surrounding air, increasing both in viscosity and surface tension with time until spherical drops form, breaking off from the falling stream. The spherical drops then begin to solidify, progressing from the surface inward. As solidification progresses, shrinkage occurs, since the solid occupies less space than the liquid. The shrinkage creates interconnected internal voids in the resulting spherical solid particles. The resulting porous solid spheres find considerable utility, both in agriculture and in industrial explosives.

There is a need, however, for a product of substantially uniform, non-spherical particle size and similar bulk density with controlled porosity. Such a product could be readily coated to prevent caking when stored in an environment in which humidity fluctuates daily, and if porosity were controlled at a minimum, would not become a sensitive explosive substance in the presence of organic matter. There are certain inherent advantages in uniform, non-spherical particles. Their behavior in conveyors, bulk storage piles and accidental spills is especially desirable, as compared with uniform spheres, which at times, flow almost like a fluid instead of remaining at rest.

We have discovered a technique whereby substantially uniform solid particles possessing only one axis of symmetry are produced from a homogeneous molten material having a freezing point between about 120° C. and 145° C. Briefly, the method comprises the following steps:

(a) Forcing molten material at a temperature of about 135° to 150° C. downward through a sufficiently small aperture so that the liquid first forms a continuous stream, which subsequently separates into individual drops of substantially uniform size;

(b) Contacting the stream of liquid material produced in step (a) with an upwardly rising stream of cooling gas at a temperature of about 50° to 75° C., said stream of cooling gas having an upward velocity between about 100 and 400 ft. per minute, conditions being controlled so that substantial freezing occurs by the time individual drops have separated from the stream of liquid material;

(c) Continuing the contacting of step (b) through a vertical distance of about 25 to 50 feet during a fall time of at least 1.5 seconds, until individual drops of the molten material consist of at least 75 percent solid material and have reached a temperature substantially below the freezing point, and (d) Suspending the individual drops of at least 75 percent solid content produced in step (c) in a stream of cooling gas until solidification is complete and subsequently recovering the product in the form of discrete solid particles of substantially uniform size and substantially cylindrical shape.

Figure 2:
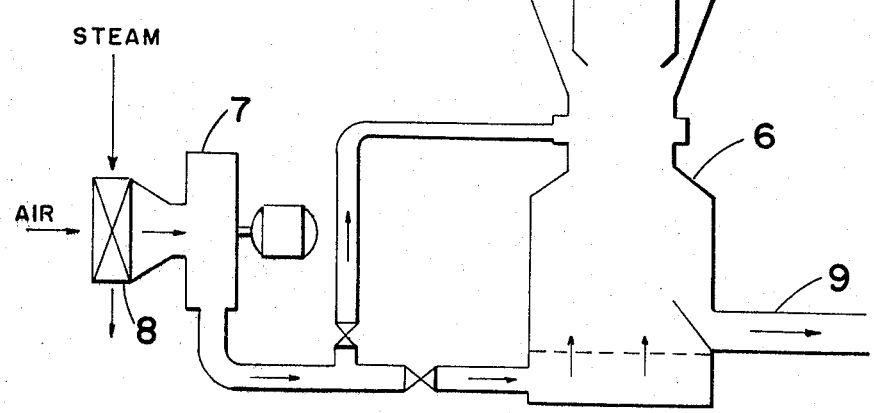

FIGURE 1 illustrates typical solid particles obtained by the method of this invention, being of generally cylindrical shape, with rounded ends, some having a perforation through the center. FIGURE 2 is a simplified diagram of a suitable apparatus for the practice of the invention. Following is a description of the method of operating the invention with suitable references to the drawings and with the aid of illustrative examples.

The use of the novel particularization method may be illustrated adequately by describing the procedure as applied to ammonium nitrate. The steps employed are described as follows:

(a) Concentrated ammonium nitrate liquor containing less than about 6 percent (preferably about 4 percent) water is supplied to a reservoir 1 where it is held at a constant depth of no more than a few feet, depth being controlled by location of an overflow 2. The ammonium nitrate liquor, at a temperature of about 140–145° C. (preferably about 140° C.), is forced by hydraulic pressure through apertures of about 0.020 to 0.040 inch in diameter located at 3, falling in a stream of small diameter which concomitantly thickens into individual drops.

(b) The stream of liquid material descends from apertures 3 through the settling column 4 where it contacts a current of air at a dry bulb temperature of about 50 to 75° C. (preferably about 55° to 65° C.) and a wet bulb temperature less than about 35° C. (preferably about 25° to 35° C.), rising at a velocity of about 100 to 400 ft. per minute (preferably about 135 to 355 ft. per minute). Moisture content and temperature of both the ammonium nitrate and the air streams, as well as air velocity are regulated so that substantial freezing occurs by the time individual drops separate from the ammonium nitrate stream.

(c) The column 4 provides a settling distance of about 25 to 50 feet, which for reasons of economy need be only 25 to 30 feet. The molten stream falls through this distance in countercurrent contact with the cooling air over a period of at least 1.5 seconds, the conditions being regulated so that the following occur:

(1) Temperature of individual particles at the bottom of the column is less than 90° C. (preferably about 65° to 90° C.).

(2) The individual particles are at least 75 percent solidified as they leave the bottom of the column.

(3) Moisture content of individual particles is less than about 3.5 percent as they leave the bottom of the settling column and preferably from about 2.5 to 3.5 percent.

The rising current of cooling air is discharged from the settling column 4 through vents 5.

(d) The particles exit from the bottom of settling column 4 into a fluidized bed dryer 6 where they are suspended in a stream of cooling and drying air at high velocity supplied by the blower 7. To provide sufficient drying effect the incoming air is heated by steam coils in the heat exchanger 8 to a temperature within the range of about 50° to 80° C. (preferably between about 55° and 70° C.). When the particles are thoroughly dry and completely solidified they are withdrawn through outlet 9. The gas stream is discharged from the fluidized bed through vents 10 and, at lowered velocity, into the settling column 4.

EXAMPLE I

Molten ammonium nitrate containing 3.6 percent water is forced downward through apertures of approximately 0.035 inch diameter under a hydraulic head of 30 inches into a settling column. The stream descends 27 feet in countercurrent contact with a stream of air having an upward velocity of 220 ft. per minute; a dry bulb temperature of 62° C. and a wet bulb temperature of 27° C. When discharged from the fluidized bed dryer, the particles consist essentially of cylinders, some with rounded ends and some with perforations along the central axis. (See FIGURE 1.) A minor proportion of fine particles discharged from the dryer appear to consist of small fragments resulting from fracture of the other particles.

EXAMPLES II TO VIII

Several experiments were conducted with an apparatus constructed essentially as illustrated in FIGURE 2. All air entering the unit entered through the fluidized bed. Provisions were made for control of ammonium nitrate liquor temperature in the reservoir 1, utilizing a steam coil and throttling valve. The apertures through which the ammonium nitrate flowed under hydraulic pressure were 0.035 in. in diameter and .020 in. long. There were 12 of these apertures. In some experiments part of the apertures were plugged or failed to operate, so that the number of particles produced varied with individual experiments. The apparatus was suitably equipped with instruments for measuring process conditions.

The operating procedure employed was essentially as outlined below. All experiments began with the apparatus in clean and dry condition.

Procedure (1) The concentration of the ammonium nitrate liquor supply was determined by noting the recorded fog point value or determining a fog point if the time elapsed since the last determination was greater than one hour. Fog points were converted to concentration by graphic calculation from previously plotted data.

(2) The liquor and air temperatures required for the particular experiment were decided upon by reference to experimental data indicative of limits of operability.

(3) The settler column air temperature was then set by adjusting the steam pressure controller on the air heater.

(4) When the settler column air temperature was at the desired value, the required air velocity in the settler column was obtained by regulating the air exit louvers on the fluidized bed dryer and at the top of the column.

(5) When the proper velocities had been established a valve in the steam line to the air heater was closed and air temperatures allowed to cool to ambient plus heat of compression. The heat of compression produced by the 3 stage turbo-blower was about 25° C. This cooling was done to provide sufficiently cold air to prevent incomplete cooling of the hot liquor used to start flow through the apertures. (Incomplete cooling during start-up permits still molten liquor to impact on the air dispersion grid of the fluidized bed dryer producing bed cakes and may plug the air nozzles.)

(6) During the "air cool down" period steam pressure to the head tank (reservoir) jacket and cooling coil was regulated to provide a temperature of 150° C. Liquor flow was then started to the head tank and the overflow arm was adjusted to provide the desired liquor head. Hot (150° C.) liquor was maintained on the aperture plate until at least 7 apertures were running and discharging parallel to the axis of the column.

(7) when at least 7 apertures were running properly, liquor temperature was adjusted to the proper level by regulating steam pressure on the head tank jacket and steam pressure and flow rate in the coil located just above the apertures. In experiments in which a very low liquor temperature was required it was necessary to feed a vapor-condensate mixture to the steam coil in the head tank.

(8) After stable liquor flow at the proper temperature was established, the column air temperature was returned to the desired value. The wet bulb temperature of the air to the unit was also adjusted to 26° C. ±1° C. at this time. This was done by injecting dry steam into the air heater discharge plenum.

(9) When the unit was stabilized at the proper air and liquor temperatures, the clean-out door in the fluidized bed dryer was opened and the start-up material raked out. The bed was allowed to blow clean after raking the bulk of the start-up material out. A clean bed was defined as one in which the air nozzles were clearly visible with only a sparse cover of particles dancing above them.

(10) When the bed was clean, the clean-out door was closed and the 30-minute experiment period started. Fifteen minutes before the end of the experiment an influent sampler was inserted into the center of the cloud of particles entering the bed from the settler. This sampler consisted of a 1-pint wide-mouth vacuum bottle mounted on a long rod. Prior to insertion into the stream of falling particles, the sampler was preheated for fifteen minutes in the air space above the bed. During the preheat period the sampler was inverted.

(11) At the end of the 30-minute period the influent sampler was removed and the temperature of the contents measured at the center of the mass in the sampler. The influent sample was then sealed for later water analysis. After withdrawal of the sampler the head tank (reservoir 1) was drained.

(12) When the reservoir had drained, the louvers on the cone and top vents 10 and 5 were closed sufficiently to provide 2–3 cm. of water positive pressure in the dryer. This pressure was necessary to operate the bed sampler.

(13) At the conclusion of the experiment, the operation of the fluidized bed dryer was continued until drying was complete. Air temperatures were maintained at experimental conditions. Bed entry air wet bulb temperatures were maintained at about 26° C. Samples of the bed were taken every 20 minutes through the bed sampler and were analyzed for water content. When a bed water content of less than 0.25 wt. percent $H_2O$ was obtained, the blower was shut down and the bed dumped. The choice of 0.25 percent water as a dump point was conservative and somewhat arbitrary. This amount of water, as expected, was tolerated without serious subsequent recrystallization and alteration of particle structure.

(14) After bed clean-out, the entire unit was washed clean with hot steam condensate and dried out with hot air preparatory to another experiment.

Product inspections

In addition to water analysis as mentioned above, the following product inspections were made:

(1) Particle size distribution.

(2) Effective particle diameters ($Dp$) as determined by the permeability technique on the 8/10, 10/14, 14/24 Tyler sieve fractions.

(3) Porosities, by the xylene displacement method (comparing a packed column of particles with a packed column of lead shot of similar mesh size) on the 8/10, 10/14 and 14/24 Tyler sieve fractions.

(4) Bulk densities on the
  (a) 8/10, 10/14 and 14/24 sieve fractions; and
  (b) 8/24 and 8/32 sieve composites.

(5) Water contents on the bed influent samples, porosity samples and selected dryer samples not previously analyzed.

(6) Visual particle shape characterization as spheroids, cylinders, tear drops or irregular.

Experimental data are presented in the following table, illustrating preferred operating conditions.

TABLE I

|  | Example No. | | | | | | |
|---|---|---|---|---|---|---|---|
|  | 2 | 3 | 4 | 5 | 6 | 7 | 8 |
| Liquor Conc., Wt. percent $NH_4NO_3$ | 96.1 | 96.5 | 96.3 | 96.3 | 96.3 | 96.3 | 96.3 |
| Liquor Temp., °C | 140.0 | 140.0 | 140.2 | 140.3 | 139.9 | 139.9 | 140.0 |
| Liq. $H_2O$ PP, mm Hg | 284.0 | 252.0 | 272.0 | 272.0 | 272.0 | 272.0 | 272.0 |
| Air Wet Bulb, °C | 28.5 | 34.4 | 26.2 | 26.8 | 27.0 | 24.3 | 26.0 |
| Liq. Head, inches | 24.0 | 36.0 | 24.0 | 36.0 | 24.0 | 24.0 | 36.0 |
| Liq. Rate, lb./aperture min | 0.335 | 0.381 | 0.335 | 0.381 | 0.335 | 0.335 | 0.381 |
| No. of apertures in use | 9 | 7 | 9 | 8 | 10 | 9 | 9 |
| Settler Entry Air, °C | 64.0 | 64.5 | 55.0 | 64.5 | 64.3 | 55.1 | 54.5 |
| Settler Air Vel., f.p.m. | 122.59 | 322.8 | 300.6 | 152.6 | 354.1 | 136.4 | 319.7 |
| Settler Exit Air, °C | 59.0 | 66.3 | 61.6 | 59.2 | 66.9 | 53.1 | 58.8 |
| Bed Entry Product Temp. °C | 71.8 | 87.6 | 73.8 | 65.0 | 82.6 | 82.8 | 82.2 |
| Bed Entry Product $H_2O$, Wt. percent | 3.30 | 3.20 | 3.06 | 3.37 | 3.14 | 3.09 | 2.60 |
| Bed Entry Air, °C | 67.5 | 67.5 | 58.0 | 58.0 | 68.3 | 61.5 | 57.8 |
| Bed Entry Air, lbs./min./ft.² | 14.0 | 14.0 | 15.0 | 14.2 | 13.8 | 13.5 | 13.6 |
| Inspections |  |  |  |  |  |  |  |
| Total, −8 Mesh, Wt. percent | 92.8 | 94.5 | 90.6 | 92.1 | 90.8 | 98.9 | 88.2 |
| +8 Mesh, Wt. percent | 7.2 | 5.5 | 9.4 | 7.9 | 9.2 | 1.1 | 11.8 |
| 8/10 Mesh, Wt. percent | 14.1 | 9.8 | 13.7 | 13.6 | 12.8 | 10.6 | 12.7 |
| Bulk Den., g./cc | 0.761 | 0.787 | 0.775 | 0.769 | 0.796 | 0.803 | 0.783 |
| Dp cm | 0.0663 | 0.0787 | 0.0671 | 0.0788 | 0.0739 | 0.0719 | 0.0763 |
| Xylene porosity, cc./g | 0.107 | 0.056 | 0.081 | 0.073 | 0.085 | 0.077 | 0.097 |
| 10/14 Mesh, Wt. percent | 45.2 | 45.2 | 46.1 | 49.6 | 38.4 | 56.4 | 39.5 |
| Form | (¹) | (²) | (²) | (¹) | (¹) | (¹) | (¹) |
| Bulk Den., g./cc | 0.775 | 0.811 | 0.830 | 0.832 | 0.815 | 0.855 | 0.819 |
| Dp cm | 0.0769 | 0.0721 | 0.0765 | 0.0500 | 0.0670 | 0.0636 | 0.0660 |
| Xylene Porosity, cc./g | 0.044 | 0.039 | 0.029 | 0.068 | 0.051 | 0.034 | 0.052 |
| 14/24 Mesh, Wt. percent | 29.3 | 36.1 | 27.5 | 24.5 | 35.3 | 25.8 | 31.1 |
| Bulk Den., g./cc | 0.685 | 0.723 | 0.721 | 0.730 | 0.710 | 0.749 | 0.726 |
| Dp cm | 0.0541 | 0.0599 | 0.0573 | 0.0488 | 0.536 | 0.0533 | 0.0534 |
| Xylene Porosity, cc./g | 0.037 | 0.027 | 0.026 | 0.034 | 0.034 | 0.040 | 0.074 |
| 24/32 Mesh, Wt. percent | 3.7 | 2.8 | 3.0 | 3.6 | 3.4 | 4.9 | 1.4 |
| −32 Mesh, Wt. percent | 0.5 | 0.6 | 0.3 | 0.7 | 0.8 | 1.2 | 1.5 |

¹ Cylinders (with some spheres).  ² Cylinders (FIGURE 1).

The method as described and specifically exemplified above is particularly adaptable to use with products which are manufactured in a volume too small to justify use of expensive prilling towers. The method of this invention is much more adaptable than prilling because more variation of process conditions is possible. For example, suitable adjustments can be made to accommodate products which crystallize or freeze too slowly to be amenable to prilling, or which are excessively hygroscopic. Since the individual particles never touch each other in a pile or stationary bed, they can be dried rather drastically before discharge and prevented from caking when they do finally make contact with each other. Thus, very hygroscopic products are free flowing and can be conveniently handled in subsequent operations such as application of anticaking coatings. If very porous products are desired, the rate of moisture removal in the settling column can be increased. However, if this is carried beyond recommended conditions, the particles may become so fragile that the substantially cylindrical shape cannot be maintained.

What is claimed is:

1. A method of particularization of a material having a melting point between about 120° C. and 145° C. comprising the steps:
   (a) Forcing molten material at a temperature of about 135° to 150° C. downward through a sufficiently small aperture so that the liquid first forms a continuous stream, which subsequently separates into individual drops of substantially uniform size;
   (b) Contacting the stream of liquid material produced in step (a) with an upwardly rising stream of cooling gas at a temperature of about 50° to 75° C., said stream of cooling gas having an upward velocity between about 100 and 400 ft. per minute, conditions being controlled so that substantial freezing occurs by the time individual drops separate from the stream of liquid material;
   (c) Continuing the contacting of step (b) through a vertical distance of about 25 to 50 feet during a fall time of at least 1.5 seconds, until individual drops of the molten material consist of at least 75 percent solid material and have reached a temperature substantially below the freezing point, and
   (d) Suspending the individual drops of at least 75 percent solid content produced in step (c) in a stream of cooling gas until solidification is complete and subsequently recovering the product in the form of discrete solid particles of substantially uniform size and substantially cylindrical shape.

2. A method of manufacturing discrete solid particles of ammonium nitrate comprising the steps:
   (a) Forcing concentrated ammonium nitrate liquor containing less than about 6 percent water at a temperature of about 140° to 145° C. downward through an aperture of about 0.020 to 0.040 inch in diameter so that the liquid first forms a continuous stream, which subsequently separates into individual drops of substantially uniform size;
   (b) Contacting the stream of liquid material produced in step (a) with an upwardly rising stream of cooling gas at a dry bulb temperature of about 50° to 75° C. and a wet bulb temperature less than about 35° C., said stream of cooling gas having an upward velocity between about 100 and 400 ft. per minute, conditions being controlled so that substantial freezing occurs by the time individual drops separate from the stream of liquid material;
   (c) Continuing the contacting of step (b) through a vertical distance of about 25 to 50 feet during a fall time of at least 1.5 seconds, until individual drops of the ammonium nitrate liquor consist of at least 75 percent solid material and have reached a temperature below about 90° C. and a moisture content of less than about 3.5 percent, and
   (d) Suspending the individual drops of at least 75 percent solid content produced in step (c) in a stream of cooling gas having a temperature within the range of about 50° to 80° C. until solidification is complete and subsequently recovering the product in the form of discrete solid particles of substantially cylindrical shape.

3. A method of manufacturing discrete solid particles of ammonium nitrate comprising the steps:
   (a) Forcing aqueous ammonium nitrate liquor of about 96 wt. percent concentration at a temperature of about 140° C. downward through an aperture of about 0.020 to 0.040 inch in diameter so that the liquid first forms a continuous stream, which subsequently separates into individual drops of substantially uniform size;

(b) Contacting the stream of liquid material produced in step (a) with an upwardly rising stream of cooling gas at a dry bulb temperature of about 55° to 65° C. and a wet bulb temperature of about 25° to 35° C., said stream of cooling gas having an upward velocity between about 135 and 355 ft. per minute, conditions being controlled so that substantial freezing occurs by the time individual drops separate from the stream of liquid material;

(c) Continuing the contacting of step (b) through a vertical distance of about 25 to 30 feet during a fall time of at least 1.5 seconds, until individual drops of the ammonium nitrate liquor consist of at least 75 percent solid material and have reached a temperature of about 65 to 90° C. and a moisture content of about 2.5 to 3.5 percent, and (d) Suspending the individual drops of at least 75 percent solid content produced in step (c) in a stream of cooling gas having a temperature within the range of about 55° to 70° C. until solidification is complete and subsequently recovering the product in the form of discrete solid particles of substantially cylindrical shape.

References Cited

UNITED STATES PATENTS

| | | | |
|---|---|---|---|
| 2,382,298 | 8/1945 | Datin | 264—14 |
| 2,887,724 | 5/1959 | Bettes | 264—14 |
| 2,934,412 | 4/1960 | Stengel | 264—13 |

ROBERT F. WHITE, *Primary Examiner.*

J. R. HALL, *Assistant Examiner.*

UNITED STATES PATENT OFFICE
CERTIFICATE OF CORRECTION

Patent No. 3,334,160                                        August 1, 1967

Peter M. Wisneski et al.

It is hereby certified that error appears in the above numbered patent requiring correction and that the said Letters Patent should read as corrected below.

Columns 5 and 6, TABLE I, fifth column, line 8 thereof, for "64.5" read -- 54.5 --; same TABLE I, sixth column, line 28 thereof, for "0.536" read -- 0.0536 --; same TABLE I, eighth column, line 30 thereof, for "1.4" read -- 3.4 --.

Signed and sealed this 13th day of August 1968.

(SEAL)
Attest:

Edward M. Fletcher, Jr.                                   EDWARD J. BRENNER

Attesting Officer                                              Commissioner of Patents